Figure 1:
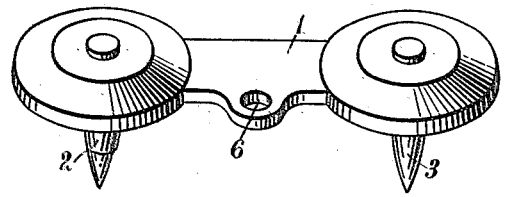

F. E. TEVES.
CAN OPENER AND SEALER.
APPLICATION FILED SEPT. 30, 1910.

1,027,932.

Patented May 28, 1912.

WITNESSES
Edw. Thorpe,
H. Whiting.

INVENTOR
Frederick E. Teves
BY
ATTORNEYS

UNITED STATES PATENT OFFICE.

FREDERICK E. TEVES, OF GLEN COVE, NEW YORK.

CAN OPENER AND SEALER.

1,027,932.  Specification of Letters Patent. Patented May 28, 1912.

Application filed September 30, 1910. Serial No. 584,674.

*To all whom it may concern:*

Be it known that I, FREDERICK E. TEVES, a citizen of the United States, and a resident of Glen Cove, in the county of Nassau and State of New York, have invented a new and Improved Can Opener and Sealer, of which the following is a full, clear, and exact description.

This invention relates to a new and improved device whereby a can of evaporated milk or the like can be provided with a plurality of openings, one of which acts as an outlet for the milk, and the other of which acts as an inlet for the air to take the place of the milk poured out, and which can further act as a sealer for closing the openings thus formed when it is desired to preserve the milk remaining in the can.

It has been found that evaporated milk, when left standing in a pitcher or can, not only collects dust and dirt, germs, microbes, etc., but also readily spoils. It has been further found that while the milk does not spoil quite so readily when left in the can, it will spoil in a shorter time than if the can were sealed.

It is, therefore, an object of this invention to provide a can opener which will provide a plurality of openings in the can so that the milk can be poured out, and which is also of such a form that when reinserted in these openings, it will exactly fill them, so as to form a practically air-tight sealer which will keep the milk a greater length of time. This is of great value to poor families, where by buying a larger can, they can obtain nearly three times the quantity of milk for double the price, thus making a great saving, as by using this device they will to a large extent be able to use the larger cans.

A further object of this invention is to provide a can opener and sealer which is adapted to make openings of various dimensions, so that, if desired, the can can be provided with small openings, so that the milk can be served from the can and these small openings readily sealed up with the device, or so that the can can be provided with much larger openings, so that the evaporated milk, which is of considerable body and thickness, can be poured out rapidly if it is desired to serve the same from a pitcher.

A still further object of this invention is to provide a device which can be used to open cans containing milk or other liquids, powders, etc., by forming punctures, the edges of which extend inwardly, leaving a smooth exterior with no rough edges to lacerate the hands.

These and further objects, together with the construction and combination of parts will be more fully described hereinafter and particularly set forth in the claim.

Reference is to be had to the accompanying drawings forming a part of this specification, in which similar characters of reference indicate corresponding parts in all the views, and in which—

Figure 2:
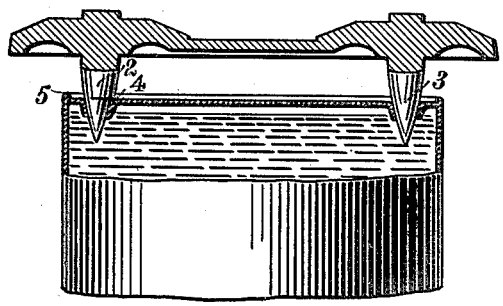
Figure 3:
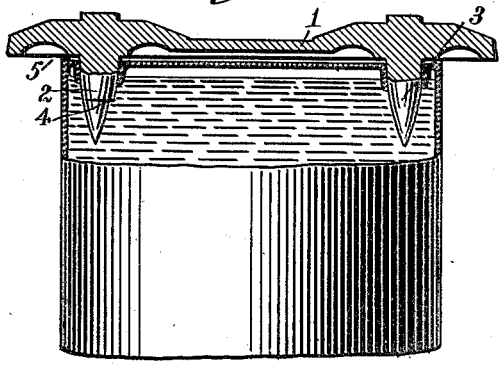

Figure 1 is a perspective view of the device detached; Fig. 2 is a fragmentary view in elevation, partly in section, showing the device in use, making the small perforations in the can, where it is desired to serve the milk or other substance from the can; and Fig. 3 is a view similar to Fig. 2, showing the device making the larger perforations, where it is desired to pour the milk entirely or part from the can at one quick operation, by which a large 16-ounce can may be emptied in less than one-quarter minute.

Referring more particularly to the specific form of the device, 1 indicates a body portion, which is provided on one side with a pair of pins 2 and 3, projecting preferably perpendicular therefrom and in spaced relation one from the other. These pins may be of any form suitable to produce a puncture or perforation in a can, such as a can of evaporated milk, and are shown in this case in the form of conical members drawn to a sharp point at their lower ends and increasing in thickness toward their junction with the body portion. The body portion and the pins may be made of any suitable material, such as cast iron, and the pins 2 and 3 may be sharpened in any suitable manner. One or both of these pins may be provided with a shoulder 4 to limit the downward motion of the pins in the cover of a can, thus forming a stop which prevents further rupture of the can without extra pressure, whereby perforations of a predetermined size can be obtained, which are suitable for the serving of the contents of the can, such as evaporated milk, from the can. It will be noted that this stop or shoulder 4 is preferably located on the inner side of the pin, so that it will not come in contact with the edge of the can, indicated at 5, and thus prevent the proper puncture of the can.

The body portion 1 is provided with an extension having an opening 6, whereby the instrument may be hung on a suitable hook when not in use.

The utility of the device will be readily understood when taken in connection with the above description. When it is merely desired to provide openings sufficient to serve the milk from the can, the pins are forced through the top of the can, until the shoulder 4 comes in engagement with the top of the can. At this point, the openings will be of sufficient size to permit the evaporated milk or other contents to flow out through one of the openings, and at the same time permit the air to flow in through the other of the openings. When a sufficient quantity of milk has been utilized, the remainder can be preserved by merely placing the sealer so that the pins 2 and 3 enter the corresponding openings. It will thus be seen that inasmuch as the same pins fill the openings which they themselves produce, they may be used to fill these openings, and thereby produce a proper seal, excluding the air from the contents of the can. If it should be desired to pour all or part of the contents of the can directly from the can, and serve from another receptacle, it is merely necessary to exert a further pressure on the instrument, forcing the pins through the top of the cover, beyond the stop or shoulder 4, until openings of sufficient size be produced. The limit of the size of these openings is produced when the body portion 1 rests on the top of the can.

While I have shown one embodiment of my invention, I do not wish to be limited to the specific details thereof, but desire to be protected in various changes, modifications and alterations which may come within the scope of the appended claim.

Having thus described my invention, I claim as new and desire to secure by Letters Patent:—

A can opener such as described, having a body portion provided with a pricking point having lengthwise sections of different diameters, said sections being eccentric each to the other, and the side wall of both sections coinciding at the outer side of said pricking point to form an extension or shoulder at the opposite or inner side of the pricking point whereby to limit the insertion of the pricking point.

In testimony whereof I have signed my name to this specification in the presence of two subscribing witnesses.

FREDERICK E. TEVES.

Witnesses:
HORATIO WHITING,
PHILIP D. ROLLHAUS.